(12) United States Patent
Zhou et al.

(10) Patent No.: US 12,385,942 B1
(45) Date of Patent: Aug. 12, 2025

(54) DIELECTRIC SENSOR CAPABLE OF IDENTIFYING RESIN FLOW DIRECTION AND PREPARATION METHOD AND APPLICATION THEREOF

(71) Applicant: HUAZHONG UNIVERSITY OF SCIENCE AND TECHNOLOGY, Hubei (CN)

(72) Inventors: Helezi Zhou, Hubei (CN); Huamin Zhou, Hubei (CN); Fengjia Zhang, Hubei (CN); Yibo Wu, Hubei (CN); Zhigao Huang, Hubei (CN); Yun Zhang, Hubei (CN); Yunming Wang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 19/026,647

(22) Filed: Jan. 17, 2025

(30) Foreign Application Priority Data

May 22, 2024 (CN) .......................... 202410639168.0

(51) Int. Cl.
*G01N 27/22* (2006.01)
*G01N 30/64* (2006.01)
*G01P 13/00* (2006.01)

(52) U.S. Cl.
CPC ........ *G01P 13/0006* (2013.01); *G01N 27/226* (2013.01); *G01N 30/64* (2013.01)

(58) Field of Classification Search
CPC .............. G01N 27/221; G01N 27/026; G01N 33/4905; G01N 27/08; G01N 2030/645; G01N 27/3278; G01N 30/64; G01N 27/226; G01N 27/22; G01N 27/223; G01N 27/228; G01N 27/447; G01N 22/00; G01N 21/554; G01N 21/41; G01N 27/028; G01N 27/227; G01N 33/2888; G01N 11/16; G01N 13/02; G01N 27/048; G01N 27/121;

(Continued)

(56) References Cited

U.S. PATENT DOCUMENTS 5,095,278 A * 3/1992 Hendrick ........... G01R 27/2635
324/687
5,208,544 A * 5/1993 McBrearty ........... G01N 27/226
324/687

(Continued)

FOREIGN PATENT DOCUMENTS

JP 2001018240 A * 1/2001 ........... G01N 27/221
JP 2018185965 A * 11/2018 ............... G01D 5/24

*Primary Examiner* — Andre J Allen
(74) *Attorney, Agent, or Firm* — JCIPRNET

(57) ABSTRACT

The disclosure provides a dielectric sensor capable of identifying a resin flow direction and a preparation method and an application thereof are provided. The dielectric sensor includes a bottom electrode being a first electrical conductor in a shape of a continuous pattern and a top electrode located within an outer contour of the continuous pattern and divided into an upper, a lower, a left and a right regions, provided with second electrical conductors arranged at intervals in the same region. A first wire connects the second electrical conductors in the left and right regions to form a first signal channel, and a second wire connects the second electrical conductors in the upper and lower regions to form a second signal channel.

8 Claims, 7 Drawing Sheets

(58) Field of Classification Search
CPC ...... G01N 33/02; G01N 33/03; G01N 33/246; G01N 33/2823; G01N 9/002; G01N 27/02; G01N 27/023; G01N 27/025; G01N 27/90; G01N 33/1833; G01N 33/241; G01N 33/2847; G01N 33/46; G01N 11/00; G01N 11/08; G01N 2011/0013; G01N 2011/0073; G01N 21/553; G01N 2291/0256; G01N 2291/02818; G01N 27/24; G01N 27/4075; G01N 27/4162; G01N 27/60; G01N 29/022; G01N 29/024; G01N 29/036; G01N 29/2437; G01N 33/0009; G01N 33/0021; G01N 33/245; G01N 33/442; G01N 33/4836; G01N 5/02; G01N 9/24; G01P 13/02; G01P 15/0802; G01P 15/125; G01P 15/131; G01P 2015/0831

See application file for complete search history.

(56) References Cited

U.S. PATENT DOCUMENTS

| | | | | |
|---|---|---|---|---|
| 6,249,130 B1 * | 6/2001 | Greer | ............... | G01N 27/226 |
| | | | | 324/687 |
| 8,246,910 B2 * | 8/2012 | Dhirani | ............ | G01N 27/3278 |
| | | | | 435/7.1 |
| 2016/0339649 A1 * | 11/2016 | Rose | ................ | G01N 25/20 |

* cited by examiner

DIELECTRIC SENSOR CAPABLE OF IDENTIFYING RESIN FLOW DIRECTION AND PREPARATION METHOD AND APPLICATION THEREOF

CROSS-REFERENCE TO RELATED APPLICATION

This application claims the priority benefit of China application serial no. 202410639168.0, filed on May 22, 2024. The entirety of the above-mentioned patent application is hereby incorporated by reference herein and made a part of this specification.

BACKGROUND

Technical Field

The disclosure belongs to the technical field related to direction monitoring, more specifically, relates to a dielectric sensor capable of identifying a resin flow direction and a preparation method and an application thereof.

Description of Related Art

Fiber-reinforced composites feature advantages such as high specific strength and high specific modulus, and thus, these materials are widely applied in fields such as aerospace and rail transportation. The liquid composite molding (LCM) process is one of the key technologies for achieving composite molding. Its efficient production and performance ensure the quality and competitiveness of the composite products. The widespread application and flexibility of this process enable the composite molding to adapt to various product requirements and play an important role in modern industry. In the LCM process, the resin flow condition affects the uniformity and integrity of resin filling in the mold. Abnormal resin flow may easily lead to defects such as voids and dry spots, and the mechanical properties of the product may thus be lowered. Further, unnecessary production waste and subsequent processing procedures may also be generated, and production costs thereby hike. By monitoring the resin flow direction, problems occurring during the resin filling process may be detected in time, and timely adjustments and improvements may thus be made. As such, the production process is stable and consistent. Further, the reliability and production efficiency of the process are improved, the uniformity and integrity of resin filling in the mold are enhanced, and the quality and performance of the product are ensured. Therefore, monitoring the resin flow direction during the LCM process is crucial and has significant importance for controlling the molding quality of composite components.

At present, sensors capable of monitoring the resin flow process include liquid pressure sensors, fiber optic sensors, capacitive sensors, etc. The fiber optic sensors are expensive, require high monitoring costs, and are fragile, and may be easily broken in actual molding processes. The liquid pressure sensors and the capacitive sensors, among others, can only be used to monitor the time when resin infiltrates the sensor region with a single sensor, but cannot be used to monitor the resin flow direction. As such, multiple sensors are required to establish a sensor array to monitor the resin flow direction. The installation, connection, and debugging of multiple sensors increase the complexity of the monitoring system. More manpower and maintenance costs are also required in practical use.

SUMMARY

In response to the above defects or the needs for improvement, the disclosure provides a dielectric sensor capable of identifying a resin flow direction and a preparation method and an application thereof aiming to reduce the costs of monitoring a resin flow process.

To achieve the above, in an aspect of the disclosure, the disclosure provides a dielectric sensor capable of identifying a resin flow direction. The dielectric sensor includes a top electrode, a bottom electrode, and a composite layer between the top electrode and the bottom electrode. The bottom electrode is an integrated first electrical conductor in a shape of a continuous pattern. The top electrode is located within an outer contour of the continuous pattern and is divided into an upper region, a lower region, a left region, and a right region. The upper region, the lower region, the left region, and the right region are provided with second electrical conductors. The number of second electrical conductors in the upper region is different from the number of second electrical conductors in the lower region, and the number of second electrical conductors in the left region is different from the number of second electrical conductors in the right region. The plurality of second electrical conductors in the same region are arranged at intervals.

A first wire connects the second electrical conductors in the left region and the second electrical conductors in the right region to form a first signal channel. A second wire connects the second electrical conductors in the upper region and the second electrical conductors in the lower region to form a second signal channel.

Further, a shape of the first electrical conductor is the same as or different from a shape of the of second electrical conductors.

Further, shapes and sizes of the second electrical conductors are the same or partially the same.

The disclosure further provides a preparation method of a dielectric sensor capable of identifying a resin flow direction, and the preparation method is used to prepare the dielectric sensor capable of identifying the resin flow direction as described above. Herein, the top electrode and the bottom electrode are prepared by any one of metal foil cutting and pasting, physical vapor deposition technology, inkjet printing technology, and spraying technology.

Further, a base material of the top electrode and the bottom electrode is any one of a polyimide film, a polyurethane film, and a polyvinylidene fluoride film.

The further provides an application of the dielectric sensor capable of identifying the resin flow direction in monitoring the resin flow direction during the LCM process according to the above, and the following is included. The dielectric sensor is pre-embedded in composites to monitor capacitance signal change characteristics of the dielectric sensor to reflect the resin flow direction during the LCM process.

Further, directional characteristics of a capacitance change of the dielectric sensor corresponds to the resin flow direction in a sensing region.

Further, signal characteristics of the first signal channel and the second signal channel are coupled to analyze the resin flow direction.

In general, when the above technical solutions conceived by the disclosure are compared to the related art, the dielectric sensor capable of identifying the resin flow direction and the preparation method and the application thereof provided by the disclosure mainly exhibit the following beneficial effects.

1. By designing the directional characteristics of the electrodes, the capacitance signal change of the dielectric sensor has a directional characteristic associated with the resin flow direction. Dual signal channels are used to connect discontinuous electrode regions with parallel directional characteristics, and signal characteristics associated with the signal channels and the resin flow direction are established, giving a single sensor the function of monitoring the resin flow direction. Therefore, the engineering application of dielectric sensors in the field of monitoring the composite molding is promoted, which helps to timely detect abnormal conditions in the flowing of resin inside the mold during production. Problems such as uneven resin filling, voids, or dry spots are avoided, and production efficiency and product quality are thus ensured.

2. A single sensor is used to monitor the resin flow direction, which is a function that conventional dielectric sensors require to establish a monitoring array with multiple sensors. Therefore, raw materials and monitoring costs are saved, the complexity of the monitoring system is reduced, the installation, layout, and use of sensors are made simpler and more convenient, production efficiency is improved, and production costs are decreased.

3. A single dielectric sensor can monitor the resin flow direction during the composite molding process, so it is easy to use, requires low costs, and is conducive to promotion and application.

DESCRIPTION OF THE EMBODIMENTS

In order to make the objectives, technical solutions, and advantages of the disclosure clearer and more comprehensible, the disclosure is further described in detail with reference to the drawings and embodiments. It should be understood that the specific embodiments described herein serve to explain the disclosure merely and are not used to limit the disclosure. In addition, the technical features involved in the various embodiments of the invention described below can be combined with each other as long as the technical features do not conflict with each other.

Figure 1:
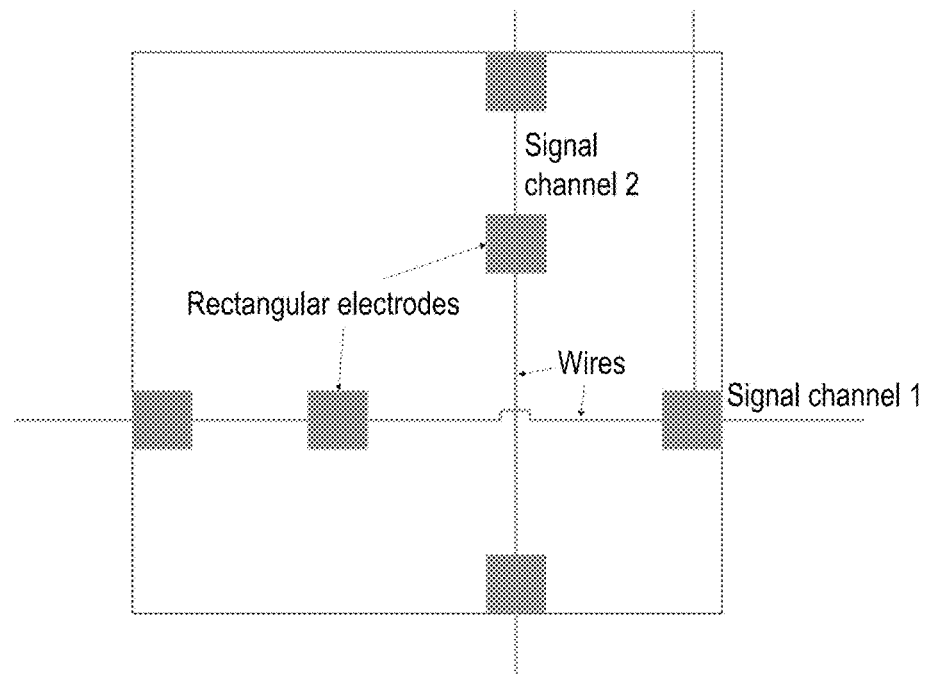
FIG. 1 is a schematic view illustrating electrodes of a dielectric sensor capable of identifying a resin flow direction in an embodiment of the disclosure.

With reference to FIG. 1, the disclosure provides a dielectric sensor capable of identifying a resin flow direction. The dielectric sensor includes a composite layer, a top electrode, and a bottom electrode. The composite layer is between the top electrode and the bottom electrode. The bottom electrode is an integrated first electrical conductor in a shape of a continuous pattern. The top electrode is located within an outer contour of the continuous pattern and is divided into an upper region, a lower region, a left region, and a right region. The upper region, the lower region, the left region, and the right region are provided with second electrical conductors. The number of second electrical conductors in the upper region is different from the number of second electrical conductors in the lower region, and the number of second electrical conductors in the left region is different from the number of second electrical conductors in the right region. The plurality of second electrical conductors in the same region are arranged at intervals.

A second wire connects the second electrical conductors in the upper region and the second electrical conductors in the lower region to form a second signal channel. A first wire connects the second electrical conductors in the left region and the second electrical conductors in the right region to form a first signal channel. The first wire and the second wire are perpendicular to each other.

The first wire and the second wire are further led out to form a first lead wire and a second lead wire respectively, and the dielectric sensor may be connected to a signal acquisition component through the first lead wire and the second lead wire. A shape of the first electrical conductor and a shape of the second electrical conductors may be any one or more of geometric shapes such as rectangle, circle, triangle, or non-geometric shapes. The shape of the first electrical conductor may be the same as or different from the shape of the second electrical conductors.

The shapes and sizes of the second electrical conductors may be all the same, or partially the same in shape and size. A base material of the top electrode and the bottom electrode is any one of a polyimide film, a polyurethane film, and a polyvinylidene fluoride film.

The disclosure further provides a preparation method of a dielectric sensor, and the preparation method is used to prepare the dielectric sensor capable of identifying the resin flow direction as described above.

Figure 9:
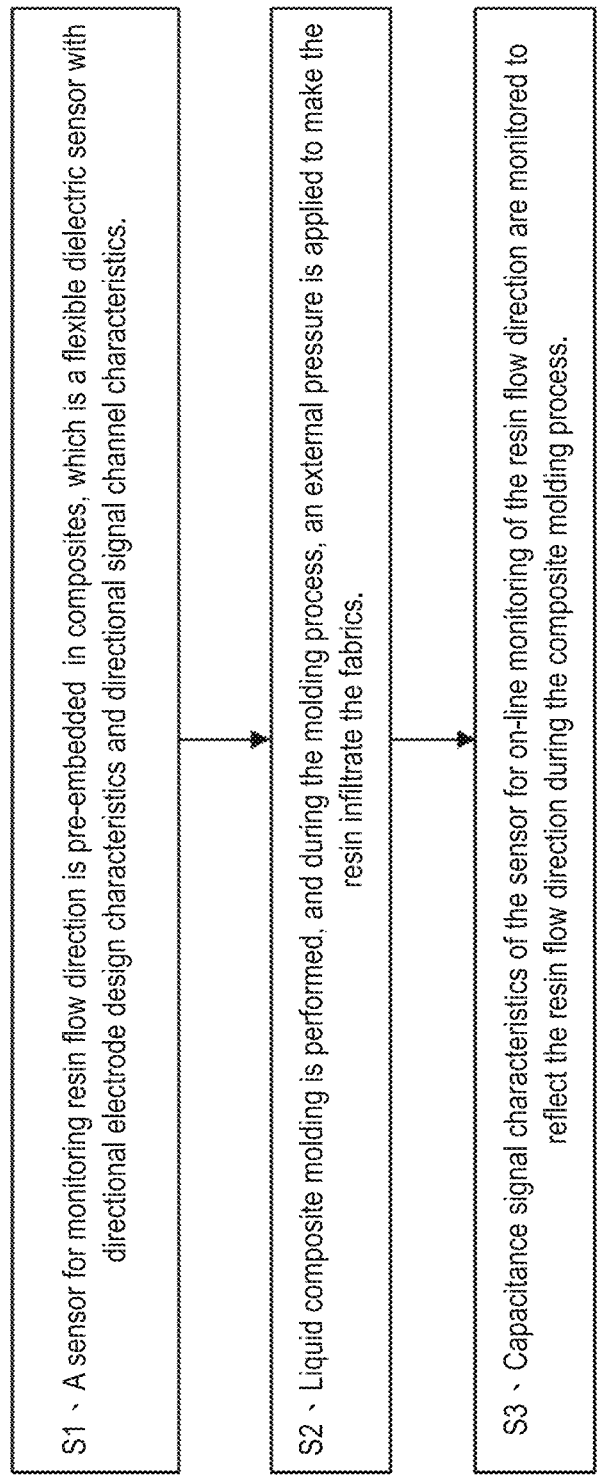
FIG. 9 is a schematic chart illustrating an on-line monitoring method of a resin flow direction in a composite molding process provided by the disclosure.

With reference to FIG. 9, the preparation method mainly includes the following steps.

In step one, a conductive material is selected.

The conductive material includes one or more of metal foil, metal powder, carbon nanotubes, graphene, graphene oxide, or reduced graphene oxide.

In step two, the shapes of the bottom electrode and the top electrode of the dielectric sensor are designed. Herein, the shape of the bottom electrode may be designed as a continuous pattern according to actual conditions. The top electrode is required to be within the outer contour line of the continuous pattern presented by the bottom electrode and is divided into four regions: the upper region, the lower region, the left region, and the right region according to a directional identification function. Herein, the electrodes in the upper and lower regions are designed as discontinuous patterns, and parts of the electrodes in the left and right regions are also set as discontinuous patterns.

In step three, a polyurethane film is adopted as a substrate, the conductive material is used as a raw material, and through an electrode preparation technology, an electrode of the sensor is formed on the polyurethane film.

The electrode preparation technology includes any one of metal foil cutting and pasting, physical vapor deposition technology, inkjet printing technology, and spraying technology.

In step four, after a flexible wire is connected to a surface of the electrode, the electrode is encapsulated with a polyurethane film, and the dielectric sensor is obtained.

The further provides an application of the dielectric sensor capable of identifying the resin flow direction in monitoring the resin flow direction during the composite molding process according to the above, and the following steps are specifically included.

In S1, the dielectric sensor is pre-embedded in composites, where the dielectric sensor is a flexible dielectric sensor with directional electrode design characteristics and directional signal channel characteristics.

In S2, liquid composite molding (LCM) is performed, and during the composite molding process, an external pressure is applied to make the resin infiltrate the fabrics.

In S3, capacitance signal characteristics of the dielectric sensor are monitored to reflect the resin flow direction during the composite molding process. Herein, directional characteristics of a capacitance change of the dielectric sensor corresponds to the resin flow direction in a sensing region.

Through the directional characteristic design of the electrodes of the dielectric sensor, the directional characteristics associating with the capacitance signal of the dielectric sensor with the resin flow direction are established. When the resin flow direction is perpendicular or parallel to a wire direction of the sensor, a single-channel signal of the sensor may identify flow fronts of the resin from different directions. However, when an angle of the resin flow direction changes, it is difficult to decouple the single-channel signal. Therefore, the sensor region is divided according to a rectangular coordinate system, and dual signal channels are used to connect discontinuous electrodes with parallel directional characteristics to establish signal characteristics associating the signal channels with the resin flow direction. As such, the sensor is allowed to monitor resin flow fronts infiltrating the sensing region from different angles. When resin infiltrates the sensing region from different angles, channels with different directional characteristics produce capacitance signals with different directional characteristics. The changing capacitance signals are collected and stored by a signal acquisition device and transmitted to a microprocessor, and the resin flow direction is monitored according to the capacitance signal change characteristics of the dual channels. The method of the disclosure uses a single sensor to achieve resin flow direction monitoring. In this way, production costs are saved, monitoring system complexity is lowered, and production efficiency is improved.

The following specific examples are provided to further illustrate the disclosure in detail.

Example 1

A preparation method of a dielectric sensor provided in Example 1 of the disclosure includes the following steps:

1) Two pieces of 50 mm*50 mm copper foil are used, and one of them is cut into a plurality of 5 mm*5 mm small rectangular pieces of copper foil for later use.

2) A commercial polyurethane plastic film is used, a 50 mm*50 mm copper foil is pasted inside the polyurethane film, and a wire and the copper foil are connected by conductive silver paste to serve as the bottom electrode of the sensor.

3) Another polyurethane plastic film is used and is divided into 50 mm*50 mm regions. The 5 mm*5 mm small rectangular pieces of copper foil are pasted into the polyurethane film as shown in FIG. 1 to serve as the top electrodes of the sensor. Conductive silver paste and a wire are used to connect the rectangular electrodes in the left and right regions to form the first signal channel. Conductive silver paste and a second wire are used to connect the rectangular electrodes in the upper and lower regions to form the second signal channel.

4) A plastic sealing machine is used to plastic seal the top and bottom electrodes, and the dielectric sensor is thus obtained.

The monitoring of the resin flow direction in the composite molding process using the prepared dielectric sensor includes the following steps:

5) 20 pieces of cut EWR200 woven glass fabric (25 cm*20 cm) are prepared, 375 g of Araldite® LY 1564 epoxy resin and Aradur® 22962 curing agent are prepared, and the mixture is uniformly mixed at a ratio of 4:1 under heating at 40° C. and then de-foamed.

6) A 3 mm transparent tempered glass plate is placed on a horizontal table, a surface of the glass plate is cleaned, a layer of release agent is evenly sprayed on the surface of the glass plate, and after spraying, the glass plate is placed in an oven at 100° C. and dried for 10 minutes. After the glass plate is taken out and cooled, a sealing tape is adhered to the four edges of the glass plate without tearing off white paper on a surface of the sealing tape. The glass fabric is laid in the sealing tape.

In this embodiment, the bottom electrode of the sensor is placed on the surface of the glass plate, and the top electrode is placed on the surface of an uppermost layer of the glass fabric. A vacuum bag film is then laid on its surface, and the white paper on the surface of the sealing tape is peeled off to form a sealed space. A vacuum pump is used to evacuate the sealed space to a vacuum state.

7) A vacuum tube used for resin infusion is placed in the resin solution prepared in step 5), a vacuum valve is opened, the resin is filled under vacuum, and the resin infiltrates a sensor monitoring region under atmospheric pressure. When a resin content in the monitoring region changes, the dielectric inside the sensor changes, and capacitance signal changes are thereby generated. These changes are transmitted through wires to the signal acquisition device. The capacitance signal change characteristics from the sensor may then be used to monitor the resin flow direction in the glass fiber composite molding process.

Herein, the capacitance signal change characteristics of the sensor is related to the directional characteristic design of the electrode, and a dual-channel signal is adopted to connect discontinuous electrodes with parallel directional characteristics. When the resin infiltrates the sensor region from a specific direction, the capacitance signal change of the sensor presents the signal characteristic of that direction.

Figure 2:
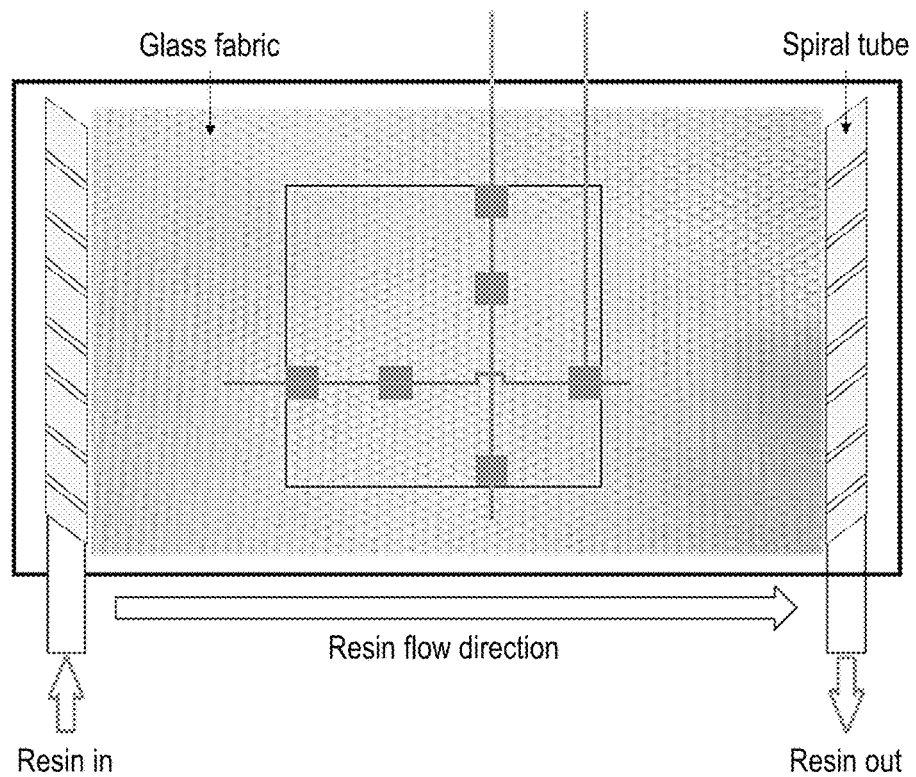
FIG. 2 is a schematic view illustrating resin flow directions in glass fabrics with the dielectric sensor attached according to an embodiment of the disclosure.
Figure 3:
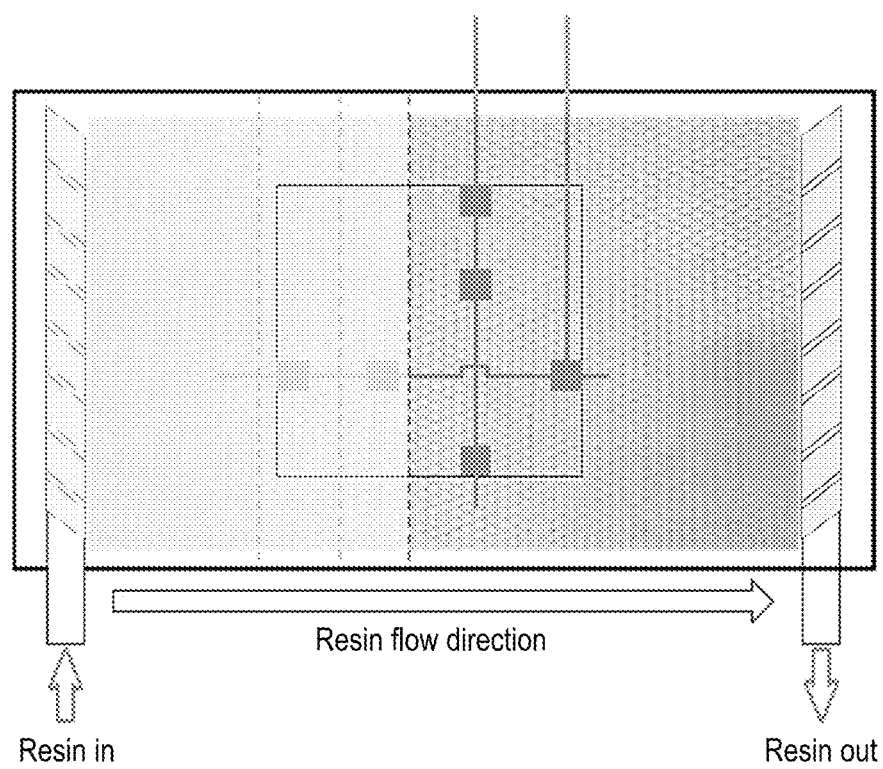
FIG. 3 is a schematic view illustrating a flow front when the resin infiltrates a left region of the dielectric sensor in an embodiment of the disclosure.

Taking the example of resin flowing unidirectionally from left to right, as shown in FIG. 2, a detailed explanation of the sensor monitoring results and analysis is provided as follows. As shown in FIG. 3 and (a) of FIG. 4, when the resin infiltrates the left region of the sensor, the first signal channel connecting the left and right regions exhibits a change in capacitance signal. Since the electrode in the left region consists of two discontinuous rectangular electrodes, the capacitance signal characteristic in this direction exhibits a "two-stage" increase. Specifically, when the resin infiltrates the first copper foil, the capacitance signal increases significantly. When the resin infiltrates the wire between the first and second copper foils, the capacitance increases slowly. When the resin infiltrates the second copper foil, the capacitance signal increases significantly again.

Figure 4:
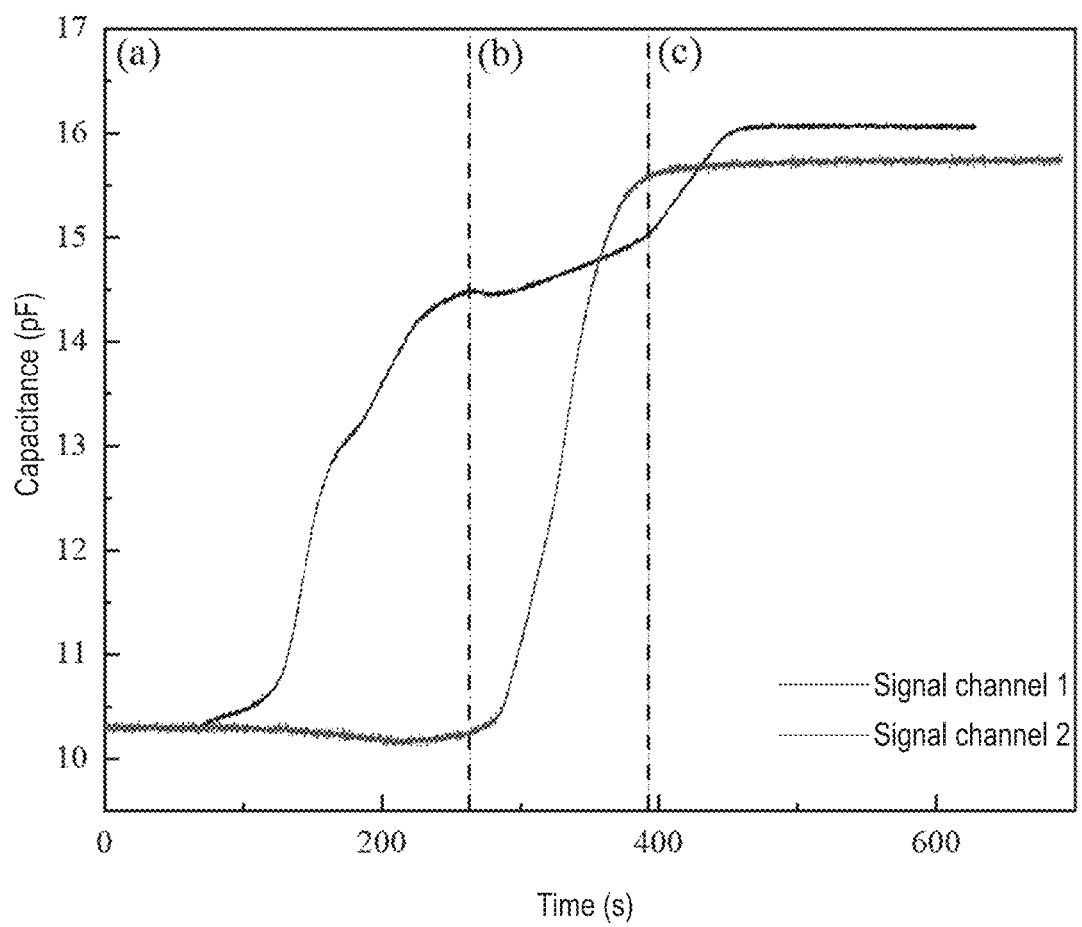
FIG. 4 is a schematic graph illustrating capacitance signal output results of a first signal channel and a second signal channel when the resin infiltrates different regions of the dielectric sensor in an embodiment of the disclosure.
Figure 5:
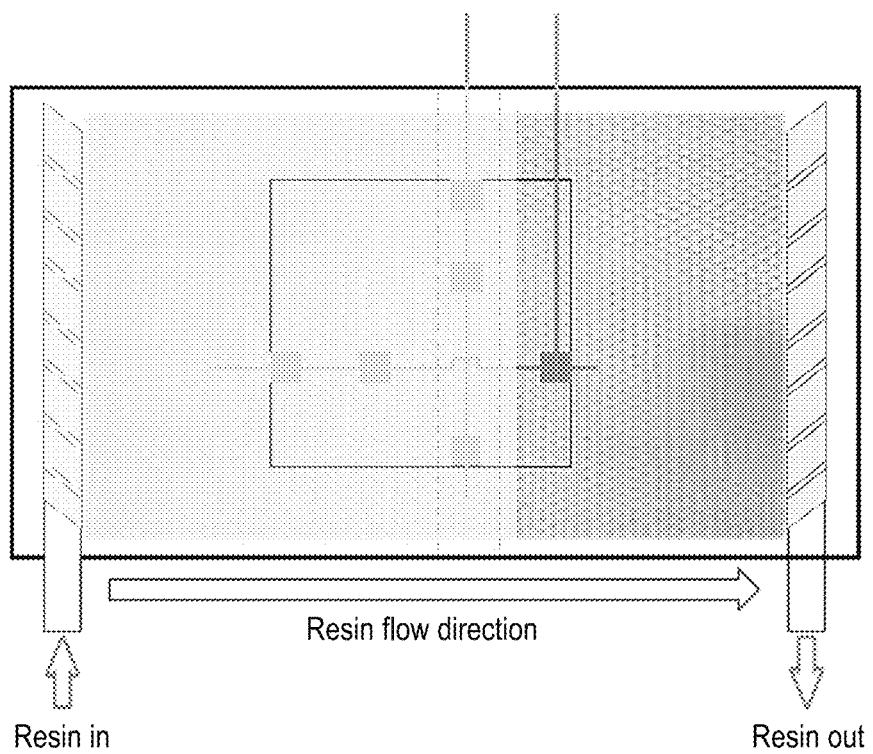
FIG. 5 is a schematic view illustrating the flow front when the resin infiltrates both an upper region and a lower region of the dielectric sensor in an embodiment of the disclosure.

As shown in FIG. 5 and (b) of FIG. 4, when the resin infiltrates both the upper and lower regions of the sensor, the second signal channel connecting the upper and lower regions exhibits a change in capacitance signal. Due to the resin infiltrating the three monitoring regions in the upper and lower regions together, the capacitance signal increases significantly and then remains stable without directional characteristics in the left and right directions, which also demonstrates the necessity of the use of dual signal channels. Herein, as the resin infiltrates a large area of a long wire segment of the first signal channel, the capacitance of the first signal channel shows a gradual increase. In this stage, the relative amplitude of signal change may be decreased through optimizing the electrode design and wire area.

Figure 6:
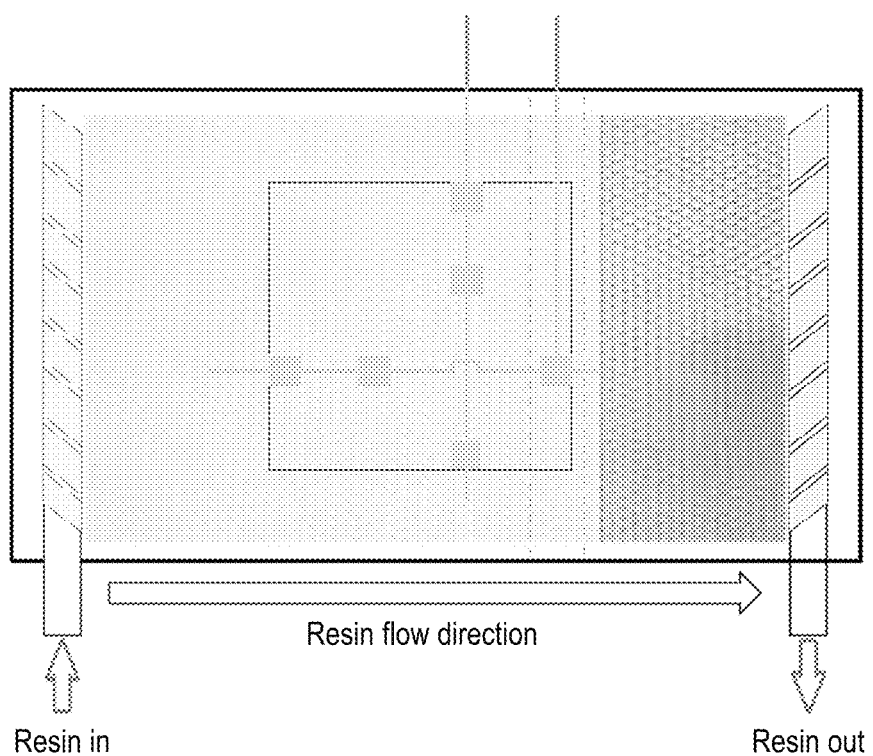
FIG. 6 is a schematic view illustrating the flow front when the resin infiltrates a right region of the dielectric sensor in an embodiment of the disclosure.

As shown in FIG. 6 and (c) of FIG. 4, when the resin infiltrates the right region of the sensor, the first signal channel exhibits a capacitance change again. Since the electrode in the right region is a single copper foil, the directional characteristic of the capacitance signal in this region is a "one-stage" increase. When the resin completely infiltrates the sensor region, the capacitance signals of the first signal channel and the second signal channel remain constant. Herein, the magnitudes of total capacitance changes of the first signal channel and the second signal channel are similar.

Example 2

Figure 7:
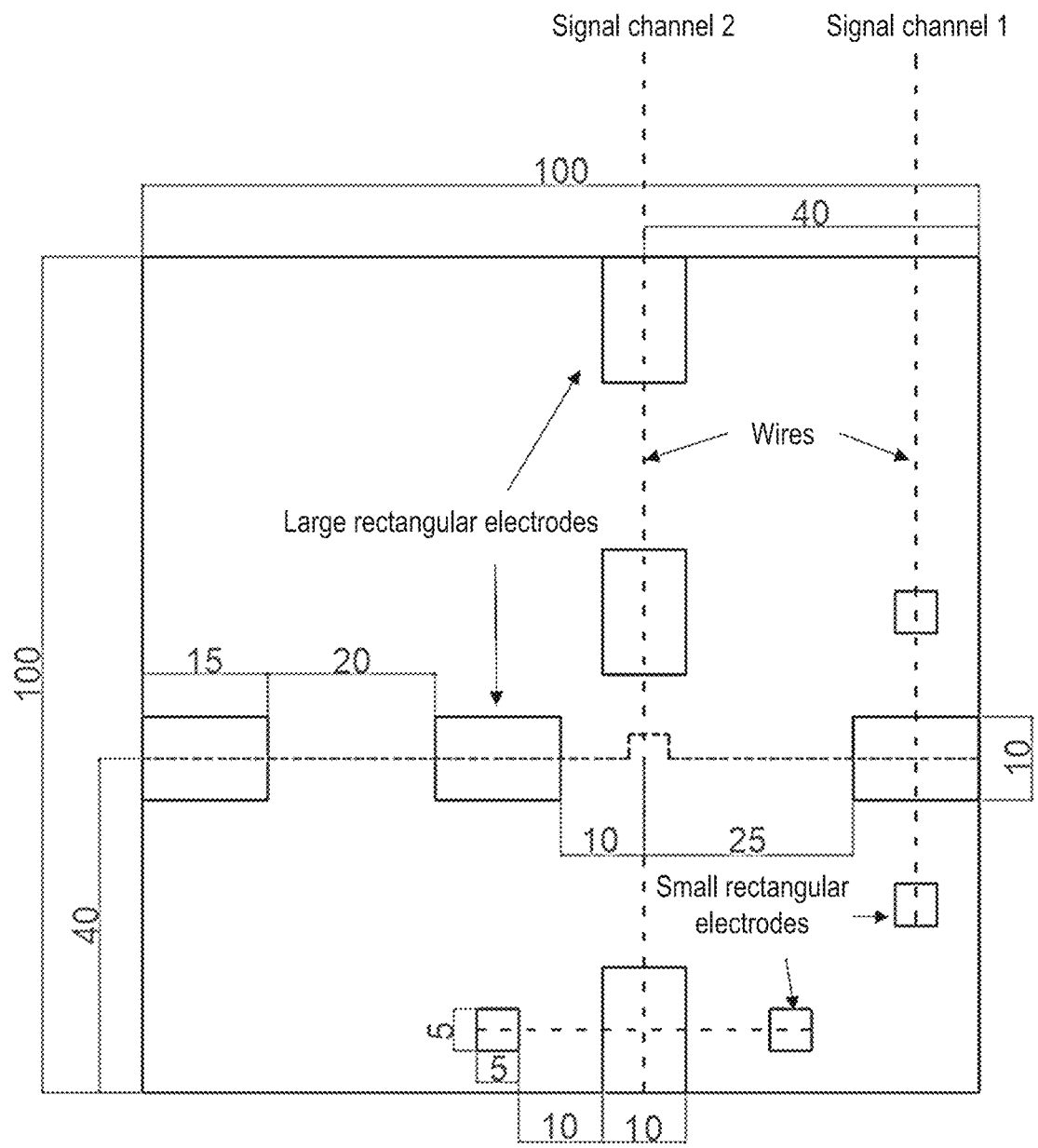
FIG. 7 is a schematic view illustrating electrodes of the dielectric sensor in another embodiment of the disclosure.

With reference to FIG. 7, a preparation method of a dielectric sensor provided in Example 2 of the disclosure includes the following steps:

1) Two pieces of 100 mm*100 mm copper foil are used, and one of them is cut into a plurality of 15 mm*10 mm large rectangular pieces of copper foil and 5 mm*5 mm small rectangular pieces of copper foil for later use.

2) A commercial polyurethane plastic film is used, a 100 mm*100 mm copper foil is pasted inside the polyurethane film, and a wire and the copper foil are connected by conductive silver paste to serve as the bottom electrode of the sensor.

3) Another polyurethane plastic film is used and is divided into 100 mm*100 mm regions. The cut rectangular electrodes are pasted into the polyurethane film as shown in FIG. 7 to serve as the top electrodes of the sensor. Conductive silver paste and a wire are used to connect the rectangular electrodes in the left and right regions to form the first signal channel. Conductive silver paste and a second wire are used to connect the rectangular electrodes in the upper and lower regions to form the second signal channel.

4) A plastic sealing machine is used to plastic seal the top and bottom electrodes, and the dielectric sensor is thus obtained.

In this embodiment, the arrangement of rectangular electrodes with different areas enables the dielectric sensor to monitor the resin flow direction more accurately. An interval distance and a connection angle between the large electrode region and the small electrode region are reasonably arranged. Therefore, when a specific angle is provided between the resin flow direction and a vertical direction, the directional characteristic of the signal channel and the directional characteristic of the capacitance signal may be more precisely associated with the resin flow direction according to the different magnitudes of signal changes caused by the resin infiltrating the sensor electrode regions of different sizes.

Figure 8:
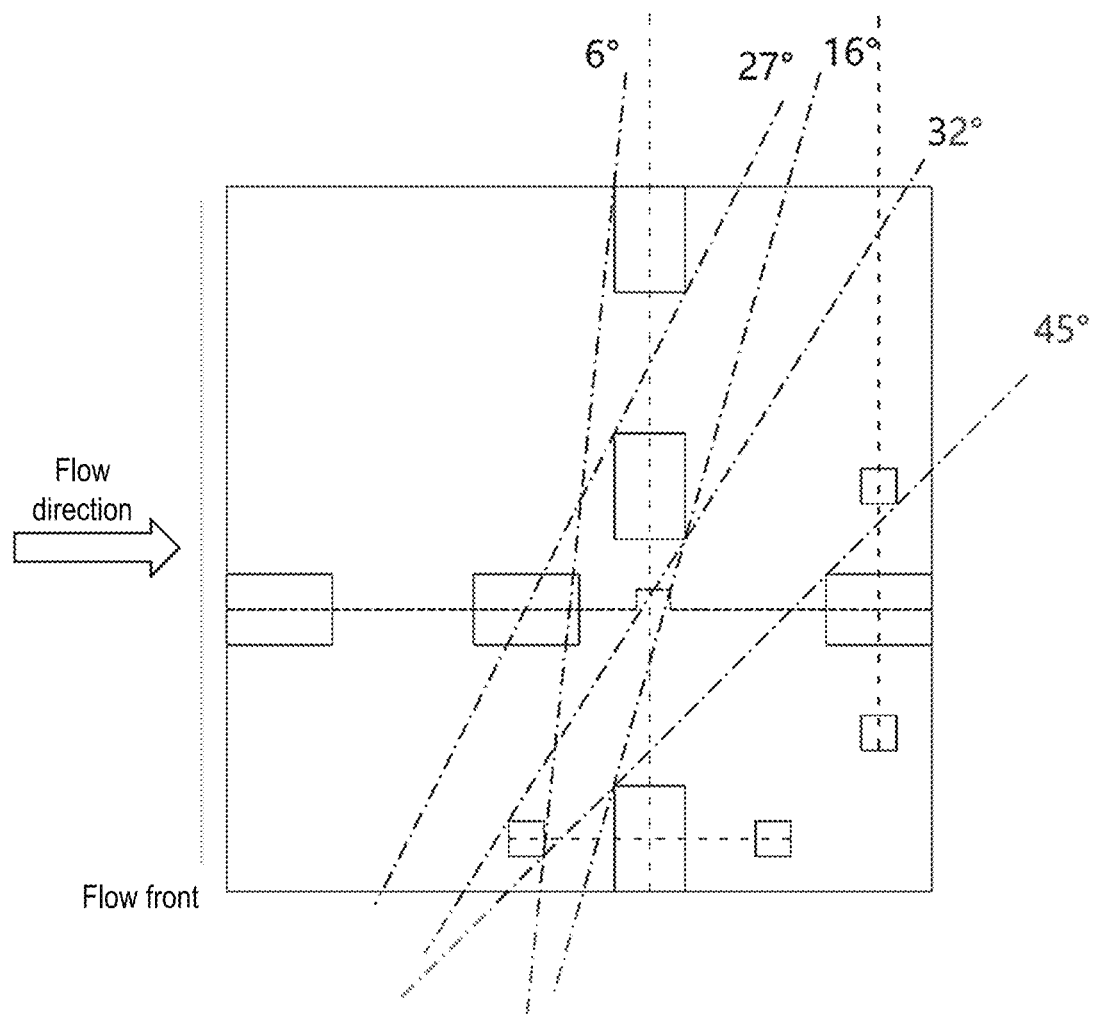
FIG. 8 is a schematic view illustrating the flow front when the resin infiltrates a sensing region of the dielectric sensor in FIG. 7.

As shown in FIG. 8, the dash-dotted lines represent the connection angles between the electrodes (with the vertical direction as the reference, a clockwise angle is positive). When the resin infiltrates the sensor region at the angle shown in the figure, the signal characteristic of the first signal channel is that the capacitance signal first shows a "two-stage" significant increase and is associated with the resin flow direction from left to right. The flowing of resin is thereby generally determined. The signal characteristic of the second signal channel is associated with a specific angle of the flow front. When the angle is 0° to 6°, the resin flow front first infiltrates the small electrode region on the left side (signal increases slightly, hereinafter referred to as "S"), then continuously infiltrates three large electrode regions (signal shows three superimposed large increases, hereinafter referred to as "L"), and finally infiltrates the small electrode region on the right side, with the signal characteristic being "S–(L+L+L)S". When the angle is 6° to 16°, the resin flow front continuously infiltrates three large electrode regions and the small region on the left side and finally infiltrates the small electrode region on the right side, with the signal characteristic being "(L+L+L+S)–S". When the angle is 16° to 27°, the resin flow front first continuously infiltrates the two large electrode regions on the upper side and the small electrode region on the left side, then infiltrates the large electrode region on the lower side, and finally infiltrates the small electrode region on the right side, with the signal characteristic being "(L+L+S)–L–S". When the angle is 270 to 32°, the resin flow front first infiltrates the uppermost large electrode region, then continuously infiltrates the middle large electrode region and the small electrode region on the left side, infiltrates the small electrode region on the lower side, and finally infiltrates the small electrode region on the right side, with the signal characteristic being "L-(L+S)–L–S". When the angle is 320 to 45°, the resin flow front first infiltrates the uppermost large electrode region, infiltrates the middle large electrode region, infiltrates the small electrode region on the left side, then infiltrates the large electrode region on the lower side, and finally infiltrates the small electrode region on the right side, with the signal characteristic being "large-large-small-large-small". When the angle is 450 to 90°, the resin flow front first infiltrates the uppermost large electrode region, then infiltrates the middle large electrode region, and finally continuously infiltrates the two small electrode regions and the large electrode region on the lower side, with the signal characteristic being "L–L–(S+L+S)". Considering the presence of an edge field of the dielectric sensor, when the resin flow direction is at critical angles (6°, 16°, 27°, 32°, and 45°), the monitored signal characteristic is based on the characteristic with more superimposed signal changes. For instance, when the resin flow direction angle is 6°, the monitored signal characteristic is based on the characteristic "(L+L+L+S)–S" at 6° to 16°. Taking this as an example, when the resin flow front infiltrates the sensor region in a negative angle direction, the signal characteristics from 0° to –90° are in reverse order of the signal characteristics at the corresponding symmetrical angles. According to the signal characteristic of the second signal channel, only a resin flow front angle within ±45° can be monitored in detail. When the angle based on the wire of the second signal channel is greater than ±45°, the resin flow front angle based on the first signal channel is within the range of 0° to ±45°. Herein, combined with the signal characteristic of the first signal channel (which is the same as the second signal channel) for coupling analysis, accurate monitoring of the resin flow direction may be achieved using a single sensor.

In the disclosure, directional characteristics associated with the resin flow direction and the capacitance signal of the dielectric sensor are established through designing the directional characteristics of the electrodes of the dielectric sensor. The signal channel is used to connect discontinuous electrodes with parallel direction characteristics, and the signal characteristics associated with the signal channels and the resin flow direction are established. In this way, on-line monitoring of the resin flow direction by the dielectric sensor during the composite molding process is achieved. Abnormal resin flowing inside the mold during production may thereby be timely detected. Further, during the composite molding process, reliable data support for parameter adjustment is provided. Conventionally, multiple sensors are required to establish a monitoring array, but through the ingenious design provided in the disclosure, the function of resin flow direction monitoring is implemented through the use of a single sensor. Therefore, the complexity of the monitoring system is decreased, production costs are saved, and production efficiency is improved. The composite molding process is thus effectively controlled.

A person having ordinary skill in the art should be able to easily understand that the above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A dielectric sensor capable of identifying a resin flow direction, wherein
   the dielectric sensor comprises a top electrode, a bottom electrode, and a composite material layer between the top electrode and the bottom electrode, the bottom electrode is an integrated first electrical conductor in a shape of a continuous pattern, the top electrode is located within an outer contour of the continuous pattern and is divided into an upper region, a lower region, a left region, and a right region, the upper region, the lower region, the left region, and the right region are respectively provided with second electrical conductors, the number of the second electrical conductors in the upper region is different from the number of the second electrical conductors in the lower region, the number of the second electrical conductors in the left region is different from the number of the second electrical conductors in the right region, and the second electrical conductors in the same region are arranged at intervals,
   a first wire connects the second electrical conductors in the left region and the second electrical conductors in the right region to form a first signal channel, and a second wire connects the second electrical conductors in the upper region and the second electrical conductors in the lower region to form a second signal channel, and the first wire and the second wire are perpendicular to each other.

2. The dielectric sensor capable of identifying the resin flow direction according to claim 1, wherein a shape of the first electrical conductor is the same as or different from shapes of the second electrical conductors.

3. The dielectric sensor capable of identifying the resin flow direction according to claim 1, wherein shapes and sizes of the second electrical conductors are the same or partially the same.

4. A preparation method of a dielectric sensor capable of identifying a resin flow direction, wherein the preparation method is used to prepare the dielectric sensor capable of identifying the resin flow direction according to claim 1, wherein the top electrode and the bottom electrode are prepared by any one of metal foil cutting and pasting, physical vapor deposition technology, inkjet printing technology, and spraying technology.

5. The preparation method of the dielectric sensor capable of identifying the resin flow direction according to claim 4, wherein a base material of the top electrode and the bottom electrode is any one of a polyimide film, a polyurethane film, and a polyvinylidene fluoride film.

6. An application of the dielectric sensor capable of identifying the resin flow direction according to claim 1 in monitoring the resin flow direction during a composite material molding process, wherein the dielectric sensor is pre-embedded between fiber layers of composite materials to be monitored, so as to monitor capacitance signal change characteristics of the dielectric sensor to reflect the resin flow direction during the composite material molding process.

7. The application of the dielectric sensor capable of identifying the resin flow direction in monitoring the resin flow direction during the composite material molding process according to claim 6, wherein directional characteristics of a capacitance change of the dielectric sensor corresponds to the resin flow direction in a sensing region.

8. The application of the dielectric sensor capable of identifying the resin flow direction in monitoring the resin flow direction during the composite material molding process according to claim 6, wherein signal characteristics of the first signal channel and the second signal channel are coupled to analyze the resin flow direction.

* * * * *